United States Patent [19]

Fitch et al.

[11] 4,408,206
[45] Oct. 4, 1983

[54] SYSTEM FOR TRANSMITTING POWER FROM A SOLAR SATELLITE TO EARTH AND SUBSEQUENT CONVERSION TO A 60 HERTZ THREE PHASE SIGNAL

[75] Inventors: John L. Fitch, Seattle; Donald B. Spencer, Federal Way, both of Wash.

[73] Assignee: The Boeing Company, Seattle, Wash.

[21] Appl. No.: 106,099

[22] Filed: Dec. 21, 1979

[51] Int. Cl.³ .............................................. H04B 7/00
[52] U.S. Cl. .................................. 343/352; 136/292; 343/365
[58] Field of Search ................. 343/100 PE, DIG. 2, 343/100 ST; 136/292

[56] References Cited

U.S. PATENT DOCUMENTS

| | | | |
|---|---|---|---|
| 3,310,805 | 3/1967 | Viglietta et al. | 343/100 PE |
| 3,535,543 | 10/1970 | Dailey | 343/DIG. 2 |
| 3,540,045 | 11/1970 | Taylor | 343/100 PE |
| 4,078,747 | 3/1978 | Minovitch | 136/292 |

*Primary Examiner*—Theodore M. Blum
*Attorney, Agent, or Firm*—Cole, Jensen & Puntigam

[57] ABSTRACT

Electrical power at microwave frequencies produced by solar cells or similar devices on satellite stations in space is phase modulated prior to its being beamed to earth. At the receiving station on earth, the power in the beamed signal is recovered at the modulation frequency. In the first embodiment, the microwave signal from the power originating device drives a circularly polarized antenna; the modulation is achieved by reversing the phase of the drive signals so that the polarization of the propagated wave alternates between right hand and left hand polarization at a 360 Hertz rate. On earth, the detected outputs of the receiving antennas are combined in such a manner to produce a 60 Hertz three phase power signal. In the second embodiment, the microwave signal drives two orthogonal, linearly polarized antennas; the modulation is achieved by gradually changing the phase of the microwave drive signals so that the polarization of the propagated wave rotates at a 60 Hertz rate. On earth, the detected outputs of three linear antennas, spaced at 120° angular intervals, are summed to produce a 60 Hertz three phase power signal.

18 Claims, 8 Drawing Figures

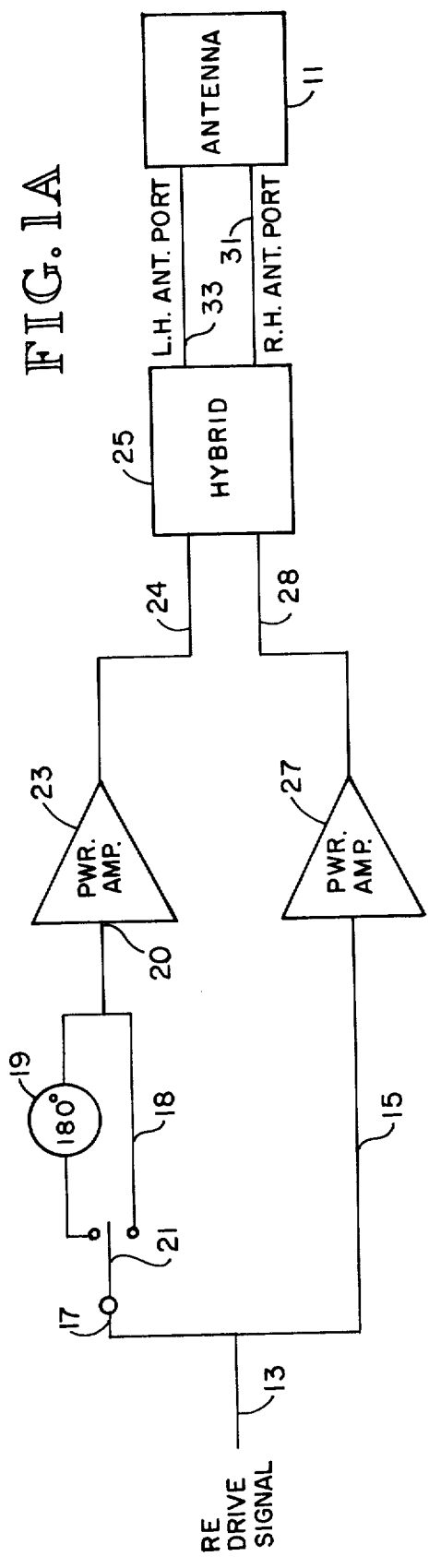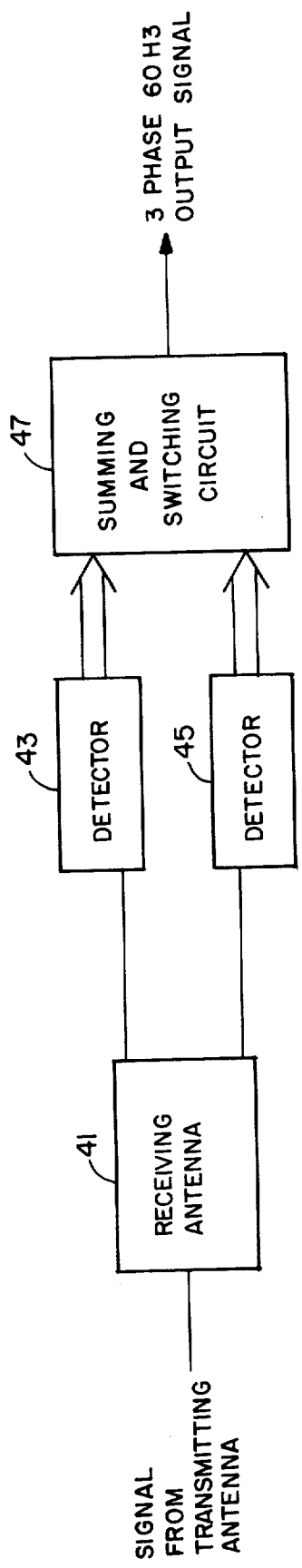

SYSTEM FOR TRANSMITTING POWER FROM A SOLAR SATELLITE TO EARTH AND SUBSEQUENT CONVERSION TO A 60 HERTZ THREE PHASE SIGNAL

BACKGROUND OF THE INVENTION

This invention relates generally to the art of power transmission, and more specifically concerns a system for transmitting microwave power from solar power generators in space to earth and subsequent conversion of the received power to a useful form.

There is a recognized need for new sources of power, and considerable interest and effort has recently been directed toward the utilization of solar energy. Electrical power may be generated directly from the sun by solar cells, or indirectly by solar collectors. One suggestion has been to locate such devices, particular solar cells, in space satellites, where they are not subject to the degrading effects of the earth's atmosphere.

The electrical power produced by the satellite-based solar power generators is then transmitted in a continuous wave at microwave frequencies to receiving stations on the earth. There remains the problem, however, of efficiently converting the microwave energy received from the satellite into a useful form, such as a 60 Hertz three phase signal. The primary conversion method known in the prior art involves first rectifying the received continuous wave microwave power to produce a DC current and then converting the DC current to a 60 Hertz three phase signal by means of inverters. This system, however, is sufficiently complex and expensive that it is impractical when compared to competing energy systems.

Efficiency is another significant problem with such systems. Polarization alignment must be constantly maintained between the transmitting and receiving antennas, since the receiving antenna on earth is fixed while the transmitting antenna on the satellite is continuously moving. Without continuous alignment of the antennas, power is lost and the efficiency of the system reduced correspondingly. The equipment necessary to maintain polarization alignment adds considerably to the already high cost of the system. Thus, satellite power beaming stations have been heretofore considered to be impractical.

Accordingly, it is a general object of the present invention to provide a system for transmitting electrical energy from space and subsequently converting that energy into a practical power signal which overcomes one or more of the disadvantages of the prior art listed above.

It is another object of the present invention to provide such a system which produces a three phase 60 Hertz signal, without the use of expensive inverters and the like.

It is a further object of the present invention to provide such a system which does not require continuous alignment of the receiving and transmitting antennas.

It is an additional object of the present invention to provide such a system which utilizes microwave power in the form generated by existing solar power generators.

SUMMARY OF THE INVENTION

Accordingly, the present invention is a system for the transmission of power at microwave frequencies, which comprises: (1) a means for generating a microwave signal; (2) first antenna means for transmitting the microwave signal; (3) second antenna means for receiving the microwave signal; (4) means for driving the first antenna means with the microwave signal in such a manner that the polarization of the transmitted signal wave rotates in space, and such that the transmitted signal wave has a recoverable characteristic identified by a frequency which is substantially less than the frequency of the microwave signal; and (5) means which is associated with the second antenna means for recovering the power in the transmitted microwave signal at the frequency of said characteristic of the transmitted wave.

DESCRIPTION OF THE DRAWINGS

A more thorough understanding of the invention may be obtained by a study of the following detailed description taken in connection with the accompanying drawings in which:

FIG. 1a is a block diagram of the transmitting portion of a first embodiment of the power transmitting system of the present invention.

FIG. 1b is a block diagram of the receiving portion of the first embodiment of the power transmitting system of the present invention.

FIG. 5b is a diagram showing a diode array which is a part of the receiving portion of the second embodiment following the antenna arrangement of FIG. 5a.

DESCRIPTION OF PREFERRED EMBODIMENT

Figure 2:
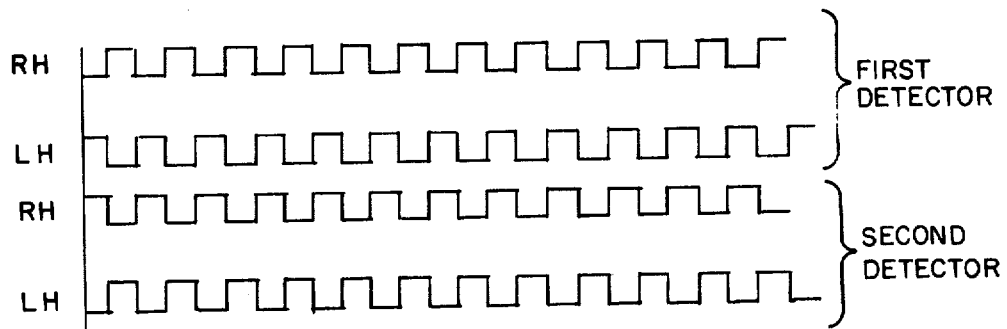
FIG. 2 is a signal diagram showing the output of the detector circuit portion of the system of FIG. 1b.

As pointed out above, the general concept of transmitting power from space to a receiving station on earth is known. In such systems, solar power generating devices, such as for example, conventional solar cells, which directly convert solar energy to electrical energy, are positioned on satellites which are in orbit around the earth, and in operation transmit electrical energy to a receiving station on earth. Although solar cells are currently particularly useful in such applications, other power generating devices, such as solar collectors, nuclear reactors, and heat pumps may be used as a source of electrical power for the system of the present invention.

On the space satellites, the solar power generators are free from the effects of the earth's atmosphere, such as structural damage caused by weather, and solar attenuation due to gas concentration and occlusion. The energy from the sun impinging upon the solar power generators is converted to electrical energy at microwave frequencies, such as for example, 2450 Megahertz, and then applied to a conventional transmitting antenna on the satellite for propagation to the receiving station on earth.

At the receiving station, the power from the microwave signal is recovered by first rectifying the signal to a DC current and then converting the resulting DC current signal to an alternating current by means of conventional inverters. Additional circuitry is necessary to convert the signal to a three phase signal, which is the conventional signal form for power applications.

The system of the present invention modulates the satellite microwave power signal while maintaining a continuous power output. Circuitry is provided at the receiving station on the earth to produce the desired three phase 60 Hertz power signal directly from the received modulated microwave signal. Two embodiments of the system of the present invention are disclosed herein. The structure of the first embodiment is the subject of FIGS. 1-3, and the second embodiment of FIGS. 4-5. Both embodiments require a transmitting antenna on the satellite which is capable of dual polarization.

In the first embodiment, the transmitting antenna is circularly polarized. In circular polarization, the transmitting antenna comprises two orthogonal microwave radiating elements, such as but not necessarily a dipole, which are driven simultaneously, but phased in such a manner that the electromagnetic wave energy from one radiating element is maximum while the wave energy from the other is minimum, so that the electromagnetic vector which represents the movement of the polarization of the propagated wave describes a circle, at the frequency of the driving signal. Thus, referring to FIG. 1a the antenna 11 of the satellite transmitter is circularly polarized.

The operation of a circularly polarized antenna is characterized by what is referred to as a direction of polarization, i.e. the electromagnetic vector representing the polarization rotates in one direction or the other. The two directions of polarization are differentiated as right hand and left hand polarization. In the embodiment of FIG. 1, the microwave drive signal which is available on input line 13 from the solar power generation system is modulated in such a manner that the circular polarization of the propagated wave alternates between right hand and left hand polarization at a rate of 360 Hertz. The circuit which produces such a modulation is shown in block form in FIG. 1. Two circuit branches 15 and 17 are driven commonly by the drive signal on line 13. In one circuit branch, a switch 21 alternately connects a 180° phase shifter 19, and a straight line connection 18 to the input 20 of a conventional power amplifier 23, which for example may be a klystron. The switch 21 switches phase shifter 19 in and out of the circuit at a desired rate, i.e. 360 Hertz, or other selected frequency. Thus, the drive signal entering circuit branch 17 will alternately undergo a 180° and a 0° phase shift, at the rate of 360 Hertz or other selected switching rate. The output of power amplifier 23 is applied to a first input 24 of a hybrid circuit 25.

The drive signal applied to the other circuit branch 15, on the other hand, is routed directly to a power amplifier 27, which may be similar to power amplifier 23. The output of amplifier 27 is applied to the other input 28 of hybrid 25. Thus, the drive signal present on line 13 is amplified continuously at its original phase by power amplifier 27 in circuit branch 15, and amplified with an alternating phase shift in circuit branch 17.

Hybrid circuit 25 is a conventional device. It has two input connections 24 and 24 and two output connections 31 and 33. One output is the algebraic phasor sum of the two inputs, and the other output is the algebraic phasor difference of the two inputs. The hybrid 25, which in the embodiment shown is a 3 db coupler, thus alternately directs the power from amplifiers 23 and 27 into the left hand port and the right hand port of antenna 11, depending on whether or not the signal at input 24 has been shifted 180° by the phase shifter 19. More specifically, during the time that the signal at input 24 has been shifted 180° the signal at both inputs is routed by the hybrid to one of the antenna ports. During the time that the signal at input 24 is not phase-shifted, the signal at both inputs is routed to the other antenna port. Although the embodiment of FIG. 1 shows the use of a hybrid in combination with a circularly polarized antenna having left and right hand ports, the same result could be achieved by routing the outputs of amplifiers 23 and 27, respectively, directly to vertical and horizontal dipoles.

The left hand and right hand antenna ports are direct inputs to the circularly polarized transmitting antenna 11 of FIG. 1. Applying power via line 33 to the left hand port, with the appropriate internal routing and phasing, results in a left hand polarization of the transmitted signal, while applying power via line 31 to the right hand port results in a right hand polarization of the transmitted signal.

The circularly polarized signal, alternating between left hand and right hand polarization, is transmitted through space to a receiving station on the earth. At the receiving station is a receiving antenna, which in the embodiment shown is formed of two orthogonal dipoles, capable of receiving a circularly polarized wave. The receiving antenna need not be continuously aligned with the transmitting antenna for a circularly polarized wave, and so the alignment problem of many prior systems is inherently solved by the use of circular polarization.

In operation, referring to FIG. 1b, antenna 41 receives the propagated signal from the transmitting antenna. In the embodiment shown, antenna 41 comprises two dipoles. Associated with the dipoles are detectors 43 and 45, which produce the outputs shown in FIG. 2. For a circularly polarized wave, the detector output of one dipole will be maximum for right hand polarization, while the output of the other detector for right hand polarization is minimum, and vice versa. Similarly, the output of the detector for one dipole is at a maximum for left hand polarization, while the output of the other detector for left hand polarization is zero, and vice versa.

The frequency of the signals from the detectors 43 and 45 is the modulation rate of switching between left hand and right hand polarization at the transmitter. The output of detectors 43, 45 is applied to a conventional summing and switching network 47, which uses the 360 Hertz signal output of FIG. 2 to construct a 60 Hertz three phase power signal such as shown in FIG. 3. Selected portions of each detector signal are combined at the right times to construct the 60 Hertz signal in the form of a staircase, so that the output of the circuit closely resembles a 60 Hertz alternating current waveform.

Figure 3:
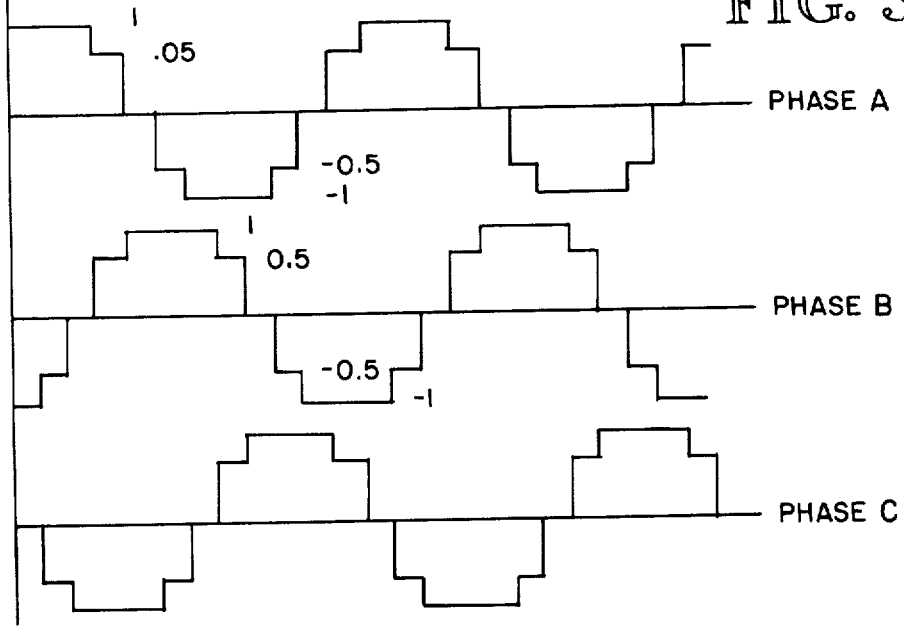
FIG. 3 is a signal diagram showing the output of the summing and switching circuit portion of FIG. 1b.

Three 60 Hertz signals are constructed from the signals of FIG. 2, 120° removed from each other, as shown in FIG. 3. This is accomplished by using different timing sequences for each signal. Thus, the output of summing and switching circuit 47 is a three-phase 60 Hertz output signal. The design of the summing and switching circuit is quite conventional, and thus, it is not discussed in detail herein. Explanation of such circuits may be found in a book entitled *Design of Solid State Power Supplies*, written by Eugene R. Hnatek (1971) and published by Van Nostrand, Rhinehold & Co.

Thus, one desired three phase, continuous wave, 60 Hertz power signal is derived directly from the transmitted microwave signal, instead of indirectly through rectifiers and inverters. Although the embodiment shown uses a 360 Hertz modulation signal, which produces the signals of FIG. 2 from which the staircase signal of desired frequency is constructed, it should be understood that other modulation frequencies may also be successfully used.

Figure 4:
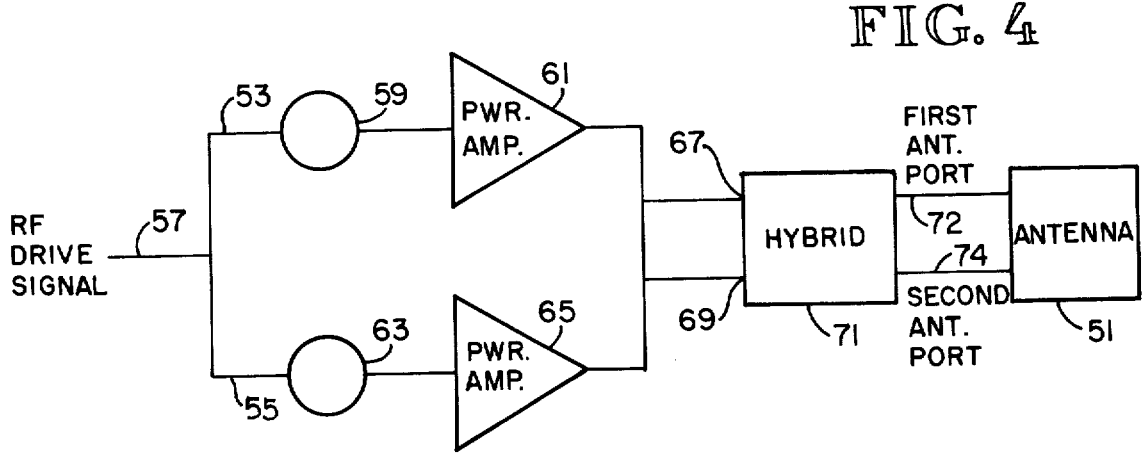
FIG. 4 is a block diagram of the transmitting portion of a second embodiment of the power transmitting system of the present invention.

FIG. 4 is a block diagram of a second embodiment of the present invention. In this embodiment, two conventional orthogonal lineraly polarized dipoles, or other radiating elements, comprise the transmitting antenna 51. The input to the transmitting antenna 51 is arranged so that the polarization of the wave propagated from antenna 51 rotates continuously at a 60 Hertz rate, the same result which would be achieved by rotating the antenna 51 at that rate. The rotation of polarization of the propagated wave inherently solves the antenna alignment problem, since there is no specific direction of polarization on which the receiving antenna can be aligned.

This rotating polarization is accomplished by gradually changing the phase of the two input signals to the transmitting antenna 51. The system of FIG. 4 includes two circuit branches 53 and 55 which have one end common to input line 57 on which is applied the microwave drive signal. Each circuit branch includes in series connection a Fox phase shifter, which is a well known device for gradually and continuously changing the phase of a signal, and a power amplifier. An explanation of the Fox phase shifter is in an article entitled *An Adjustable Waveguide Phase-Changer*, by A. Gardner Fox, in the Proceedings of the IRE, December, 1947. Circuit branch 53 includes a Fox phase shifter 59 and a power amplifier 69 while circuit branch 55 includes a Fox phase shifter 63 and a power amplifier 65.

The outputs of amplifiers 61 and 65 are connected, respectively, to inputs 67 and 69 of hybrid circuit 71, which is similar to hybrid circuit 25 in the embodiment of FIG. 1. The two outputs 72, 74 of the hybrid are then applied, respectively, to a first antenna port, referred to as the vertical polarization port, and a second antenna port, referred to as the horizontal polarization port. These could be, for instance, the inputs to horizontal and vertical dipoles.

The Fox phase shifters 59 and 63 operate in opposite phase directions, i.e. one phase shifter, e.g. phase shifter 59, gradually but continuously advances the phase of the drive signal applied thereto, while the other phase shifter 63 gradually retards the signal applied to its input. The phase shifters are set so that a full 360° phase shift is completed in 1/60th of a second, thus causing the polarization of the wave propagated by the antenna 51 to rotate at a 60 Hertz rate. The rotating polarization of the propagated makes physical alignment of the transmitting and receiving antennas unnecessary, as with the first embodiment.

Figure 5A:
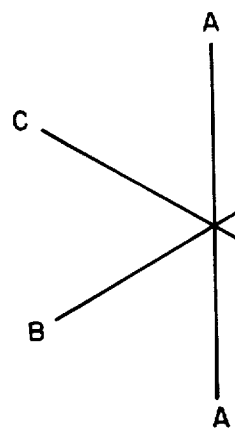
FIG. 5a is a diagram showing the alignment of the antennas of the receiving portion of the second embodiment of the power transmitting system of the present invention.
Figure 5B:
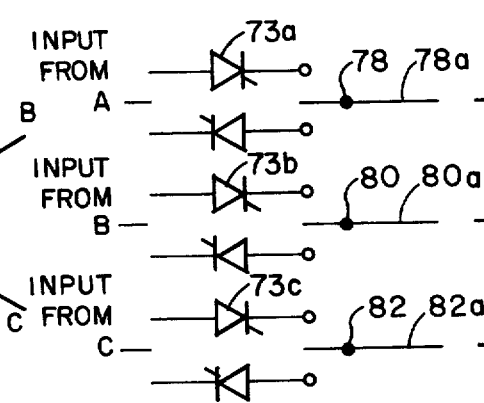

The resulting continuous wave output from transmitting antenna 51, with a 60 Hertz polarization rotation, is transmitted to the receiving station on earth. FIG. 5a shows a simplified arrangement for a receiving antenna which comprises a set of three dipoles A, B and C, positioned at 120° angular intervals. Since the transmitted signal has a rotating polarization, a sine wave will be introduced into each dipole, at the frequency of rotation. Connected to each dipole is a diode set, shown in FIG. 5b as 73a for dipole A, 73b for dipole B and 73c for dipole C. Each diode set consists of a parallel connection of two diodes, connected with opposite polarity. The input to each diode set is the sine wave signal from its associated dipole in the receiving antenna.

Figure 5C:
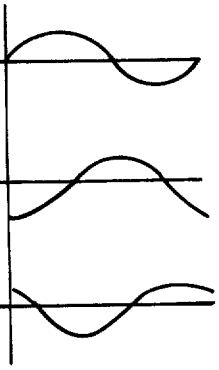
FIG. 5c is a signal diagram showing the signal output of the diode array of FIG. 5b.

At the output end of each diode set, respectively, are switches 78, 80 and 82, which alternately connect the two diodes in each diode set its associated output line. Since each diode will conduct over one-half cycle of the signal from its associated dipole, the output on each of the output lines 78a, 80a and 82a will be a sine wave, as shown in FIG. 5c.

The frequency of the sine wave will be the modulation frequency of the transmitted signal, i.e. the frequency of rotation of polarization of the propagated wave. The wave forms on the output lines 78a, 80a and 82a will be at 120° angular intervals. Thus, combining the wave forms of FIG. 5c will result in a three phase, 60 Hertz signal, which may be used directly as a power signal. The second embodiment of FIGS. 4 and 5, like the first embodiment, thus provides a three phase, 60 Hertz signal directly from the transmitted signal, but is less complex and hence substantially less expensive then the first embodiment, and hence in some applications may be desirable.

Thus, apparatus has been disclosed which directly provides a three phase, 60 Hertz signal from a microwave signal. Although the invention is described in the context of a space-to-earth application, the application of the invention is not limited thereto, but rather, may be useful in a variety of power transmission applications. The two embodiments disclosed, while utilizing slightly different structural arrangements and operating on the microwave signal slightly differently, both modulate the microwave signal prior to its transmission, with the modulation being recovered by the receiving equipment and used to provide the desired signal.

Although a preferred embodiment of the invention has been disclosed herein for purposes of illustration, it should be understood that various changes, modifications and substitutions may be incorporated in such embodiment without departing from the spirit of the invention as defined by the claims which follow.

What is claimed is:

1. A system for transmission of power which is in the form of continuous-wave microwave-frequency electrical signal energy, comprising:

first antenna means configured and arranged to transmit the microwave signal with a given polarization;

means for driving said first antenna means with a microwave signal in such a manner that the polarization of the transmitted microwave signal changes regularly with time throughout the transmission of the microwave signal, in a predetermined manner, at a selected rate which is substantially less than the frequency of the microwave signal;

second antenna means for receiving the transmitted microwave signal;

means associated with said second antenna means for recovering the power in the transmitted microwave signal received by said second antenna means; and means responsive to said recovering means for converting the recovered microwave signal into a three phase signal at a power frequency, the resulting signal being suitable for use as a power signal.

2. The system of FIG. 1, wherein said first and second antenna means move related to each other in operation of the system.

3. The system of claim 1, wherein the power frequency is 60 Hertz.

4. The system of claim 1, wherein said generating means, said first antenna means, and said driving means are located on a satellite in space, and said second antenna means and said recovering means are located on earth.

5. The system of claim 1, wherein the transmitted signal wave is a continuous wave.

6. The system of claim 1, wherein said first antenna means comprises two orthogonal dipoles capable of circular polarization.

7. The system of claim 6, wherein the first antenna means is circularly polarized, so that the polarization of the transmitted signal wave rotates at the frequency of the microwave power signal, and wherein said driving means includes means for alternating the polarization of the transmitted signal wave between left hand and right hand circular polarization.

8. The system of claim 7, wherein said first antenna means includes left hand and right hand ports and wherein said means for alternating includes two circuit branches, each responsive to the mircowave signal, one circuit branch including a 180° phase shifter and switching means for switching said phase shifter into and out of said first circuit branch, and means for applying the output signals from said first and second circuit branches alternately to said left hand and right hand ports of said first antenna means.

9. The system of claim 8, wherein said second antenna means includes two orthogonal dipoles, and wherein said recovering means includes detector means associated with each dipole, and a summing and switching means responsive to the outputs of said detector means for producing three alternating current waveforms at the power frequency, each waveform being separated in phase by 120°.

10. The system of claim 9, wherein the selected frequency is 360 Hertz and the power frequency is 60 Hertz.

11. The system of claim 6, wherein said first antenna means comprises two orthogonal radiating elements, each of which is linearly polarized, and wherein said driving means includes means for changing the phase of the signal provided to each radiating element in such a manner that the polarization of the transmitted signal wave rotates at the selected frequency.

12. The system of claim 11, wherein said driving means includes two circuit branches, each responsive to the microwave power signal, each branch including a phase shifter, the phase shifter in one circuit branch gradually changing the phase of the signal in that circuit branch in one direction and the phase shifter in the other branch gradually changing the phase of the signal in that branch in the other direction, said driving means including means for applying the outputs of the first and second circuit branches to said two radiating elements of said first antenna means.

13. A system of claim 12, wherein said second antenna means includes three dipoles spaced at equal angular intervals relative to each other, and said converting means includes diode means associated with each dipole and a switch connected to each diode means, each diode means including a parallel connection of two diodes in opposite polarity, the switch connecting each diode in the diode means alternately to an output line, wherein the signal produced on the output line is an alternating current waveform at the power frequency, with the waveforms from the three diode means being at 120° angular intervals.

14. A method for transmitting power which is in the form of continuous-wave microwave-frequency electrical signal energy, comprising the steps of:
   transmitting the microwave signal with a polarization that changes regularly with time throughout the transmission of the microwave signal, in a predetermined manner, at a selected rate which is substantially less than the frequency of the microwave signal;
   receiving the transmitted microwave signal;
   recovering the power from the received microwave signal; and
   converting the recovered microwave signal into a three phase signal at a power frequency, the resulting signal being suitable for use as a power signal.

15. The method of claim 14, wherein the source of the transmitted electrical signal is a converter which produces microwave signal energy from solar energy, and wherein the microwave signal is transmitted from a satellite in space to earth.

16. The method of claim 14, wherein the transmitted microwave signal is circularly polarized, and wherein the method includes the steps of alternating the polarization of the transmitted microwave signal between left hand and right hand polarization.

17. The method of claim 14, wherein the transmitted microwave signal is linearly polarized, and wherein the method includes the steps of continuously changing the phase of the polarization of the transmitted microwave signal at the selected rate.

18. The method of claim 16 or 17, wherein the selected rate of change of the polarization is a multiple of sixty hertz.

* * * * *